Figure 1:
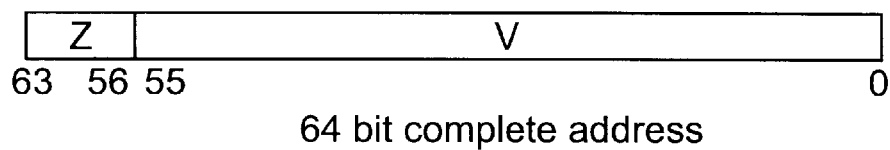

United States Patent [19]
Liedtke

[11] Patent Number: 6,079,004
[45] Date of Patent: Jun. 20, 2000

[54] METHOD OF INDEXING A TLB USING A ROUTING CODE IN A VIRTUAL ADDRESS

[75] Inventor: Jochen Liedtke, Sankt Augustin, Germany

[73] Assignee: International Business Machines Corp., Armonk, N.Y.

[21] Appl. No.: 08/875,134

[22] PCT Filed: Jan. 29, 1996

[86] PCT No.: PCT/EP96/00333

§ 371 Date: Jul. 18, 1997

§ 102(e) Date: Jul. 18, 1997

[87] PCT Pub. No.: WO96/23260

PCT Pub. Date: Aug. 1, 1996

[30] Foreign Application Priority Data

Jan. 27, 1995 [DE] Germany .......................... 195 02 473

[51] Int. Cl.$^7$ .................................................. G06F 12/10
[52] U.S. Cl. ............................................................ 711/207
[58] Field of Search ..................................... 711/206, 207

[56] References Cited

U.S. PATENT DOCUMENTS 3,675,215  7/1972  Arnold et al. .
4,215,402  7/1980  Mitchell et al. .
4,376,297  3/1983  Anderson et al. .

FOREIGN PATENT DOCUMENTS 0 528 584 A1  2/1993  European Pat. Off. .

OTHER PUBLICATIONS

Proceedings of 1989 IEEE International Conference on Computer Design: VLSI in Computers & Processors, Oct. 2–4, 1989, Cambridge, Massachusetts, Ramachandran et al., "Design of a memory Management Unit for Object–Based System", pp. 512–517.

*Primary Examiner*—Eddie P. Chan
*Assistant Examiner*—Kevin Verbrugge
*Attorney, Agent, or Firm*—Akin, Gump, Strauss, Hauer & Feld, L.L.P.

[57] ABSTRACT

The method serves to operate an address translation device for translating a virtual address of a virtual address space comprising a plurality of pages into a physical address of a physical address space comprising a plurality of pages, with the use of a translation lookaside buffer and a page table. The address translation is performed in the following manner: the translation lookaside buffer is indexed to an index by the routing code associated with the virtual address or by a mapping of the routing code associated with the virtual address, or it is indexed to an index by a mapping of the routing code associated with the virtual address and the first address portion of the virtual address. In case of a TLB hit, a page table parsing is executed using only the virtual address. The routing code used to index the TLB is not included in the page table parsing.

10 Claims, 2 Drawing Sheets

Routing code directly addressed TLB 64 bit complete address

Routing code directly addressed TLB

Routing code hashed addressed TLB direct-mapped TLB

METHOD OF INDEXING A TLB USING A ROUTING CODE IN A VIRTUAL ADDRESS

This application is a 371 of PCT/EP96/00333 filed Jan. 29, 1996.

This invention refers to a method for operating an address translation device for translating a virtual address into a physical address, the translation device being designed as a (direct-mapped or n-way set-associative) translation lookaside buffer (TLB), and the method allowing to avoid systematic clashing.

Modern processors use TLBs for a fast translation of virtual into physical addresses. Typically, the TLB and the cache are located on the processor chip.

Figure 4:
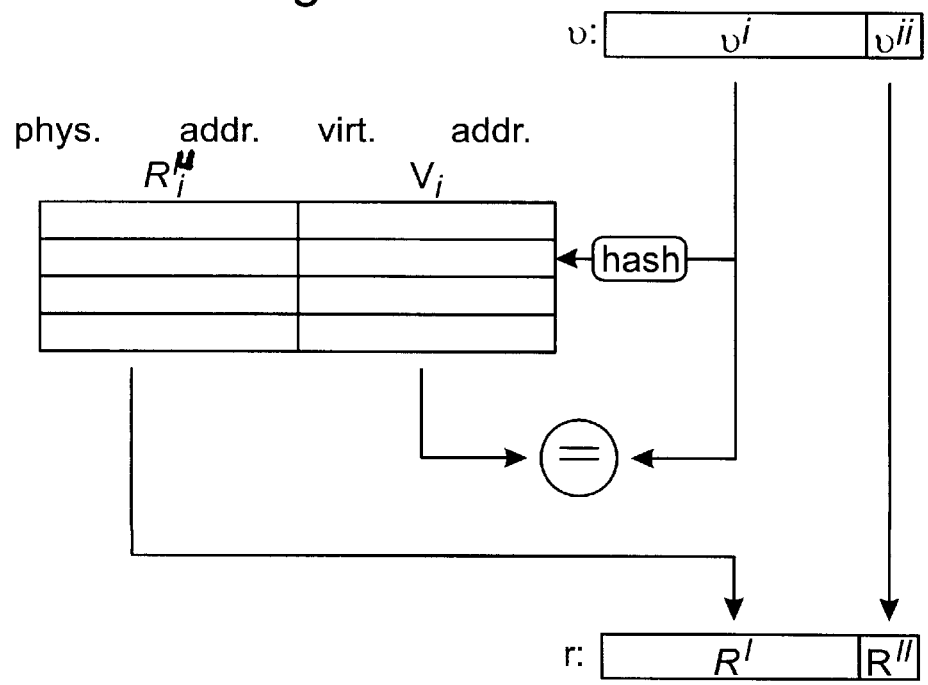

A TLB is a special cache for address translation. While fully set-associative TLBs are also employed, TLBs are generally n-way set-associative. FIG. 4 illustrates a direct-mapped TLB, i.e. a 1-way set-associative TLB. The high-order portion v' (first address portion) of the virtual address v is used to address a line of the TLB. There, (in a tag field,) the virtual page address $v'_i$ associated with this entry, the physical page address $r'_i$ contained in a data field associated with the tag field, and status bits not shown in the Figure can be found, the status bits also indicating the validity of the entry. If it is valid, and $v'_i$ matches the present page address v', there is a TLB hit and the physical address is combined from the lower-order portion v" (second address portion) of the virtual address and the physical page address $r'_i$ provided by the TLB.

An n-way set-associative TLB differs from a direct-mapped TLB in that a plurality of marking and data fields are included in one entry, which are addressed simultaneously and are checked in parallel against v'. A hit is given when the contents of a tag field of the indexed TLB entry are correct; the, the $r'_i$ and the status bits thereof are used to form the physical address r and for access validation.

For large address spaces, a direct-mapped or n-way set-associative TLB is to be designed that allows to systematically minimize clashing for optional working sets of virtual pages. Here, the term working set means the number of all virtual pages presently in use, while "clashing" refers to a conflict between the virtual pages contained in the TLB.

To solve this object, an operating method for a TLB address translation device is provided, the method steps thereof being mentioned in claim 1. The method steps stated in the subclaims concern advantageous embodiments of the invention.

The present method serves to operate an address translation device for translating a virtual address of a virtual address space comprising a plurality of pages into a physical address of a physical address space comprising a plurality of pages with the use of a translation lookaside buffer and a page table. Here, the virtual address can be divided into a first address portion and a second address portion. According to the present invention, the virtual address is associated with a routing code. The physical address also has first and second address portions. The two address portions of the virtual address and the physical address can in particular be the page number address portion for addressing a page in the virtual or the physical address space, respectively, and the offset address portion for addressing within a physical or virtual page. The translation lookaside buffer contains a plurality of entries, each of which comprises at least one tag field and at least one data field associated to the tag field (additionally, further fields for control information or the like, especially a validity/invalidity field, may be provided).

According to the invention, the address translation is performed in the following manner:

initially, the translation lookaside buffer is indexed to an index by the routing code associated with the virtual address or by a mapping of the routing code associated with the virtual address, or it is indexed to an index by a mapping of the routing code associated with the virtual address and the first address portion of the virtual address. In contrast to conventional TLBs using a portion of the virtual address for indexing, the invention provides for an indexing of the TLB by the routing code, i.e. information that does not form a part of the virtual address itself. If applicable, a portion of the virtual address, namely its first address portion, is used in addition to the routing code. In most cases, mathematic mappings of the bits of the routing code (and possibly the virtual address) to index the TLB by an index generated in this manner.

After indexing, it is checked, whether the contents of a tag field the indexed entry of the translation lookaside buffer match the first address portion of the virtual address. This is equally true for direct-mapped TLBs and the n-way set-associative TLBs.

If a tag field exists with contents that match the first address portion of the virtual address, there is a TLB hit. In this case, the physical address is composed from the contents of the data field associated with this tag field, as the first address portion of the physical address, and from the second address portion of the virtual address.

If, however, there is no tag field in the indexed entry that would match the first address portion of the virtual address, there is a TLB miss. In this case, the page table is parsed and the first address portion of the physical address is derived from the page table, the page table being parsed according to the virtual address, and the physical address being composed from the first address portion resulting from the first address portion and from the second address portion of the virtual address. The page table has so-called terminal entries that directly indicate a data page of the physical address space, i.e. they include a portion of the physical address. The first address portion of the virtual address, as well as the first address portion of the physical address resulting from the page table are taken into the TLB.

Preferably, it is provided that, upon a TLB miss, the first address portion of the virtual address and the first address portion of the physical address resulting from the page table are loaded into that entry of the TLB that has been indexed during the access to the translation lookaside buffer, which is the origin of the TLB miss. Thus, the contents of the indexed entry of the TLB are updated in the process without altering the routing code associated with the virtual address.

Preferably, the page table provides a routing code field with a routing code, in addition to the first address portion of a physical address. The contents of the routing code field, resulting from the parsing of the page table, is compared to the routing code associated with the virtual address. If the contents of the routing code field does not match the routing code associated with the virtual address, the translation lookaside buffer is indexed using the contents of the routing code field or the contents of the routing code field and the first address portion of the virtual address. Should there be a TLB hit, the respective data field of the translation lookaside buffer is tagged as invalid and the routing code associated with the virtual address is stored in the routing code field of the page table entry. The operation described above is also referred to as a TLB flush. Irrespective of whether there is a TLB flush, the first address portion of the virtual address and the first address portion of the physical address resulting from the page table will then be loaded into the entry of the translation lookaside buffer that has been indexed using the routing code associated with the virtual address or using the routing code associated with the virtual address and the first address portion of the virtual address (for indexing, one may again use a mapping (hash) function).

When using a page table, the terminal entries of which also include routing codes or are associated therewith, it may be advantageous upon a TLB miss, to compose the physical address according to the address portion resulting from the page table only when the routing code provided by the page table matches the routing code associated with the virtual address. If this is not the case, feasibly, a routing code error is indicated.

As an alternative, if there is a TLB miss and the routing code provided by the page table does not match the routing code associated with the virtual address, the routing code provided by the page table may be associated to the virtual address for the present translation and for the future translation thereof.

In a preferred embodiment of the invention, it is possible that the routing codes associated with the virtual addresses include one or a plurality of control bits that do not serve to index the translation lookaside buffer, but to manage the translation lookaside buffer. An example of such a control bit is a so-called early flush bit, which is stored in the TLB entry—a pair of marking and data fields—and indicates, when set that this pair of marking and data fields may be flushed if necessary.

Preferably, the virtual address is part of a bit string having bits for the first address portion of the virtual address, bits for the second portion of the virtual address and bits for the routing code associated with the virtual address. The user or the user program or the operating program supply as the "virtual address in the most general sense" the above bit string including the actual virtual address and the routing code associated therewith.

As an alternative, it is further provided that each entry of the TLB has at least one routing code field associated with a tag field, and that the routing code associated with the virtual address is compared with the contents of that tag field of the indexed entry of the translation lookaside buffer whose contents is equal to that of the first address portion of the virtual address, and that there is a TLB hit when the routing code associated with the virtual address equal s the routing code of the routing code field.

Figure 2:
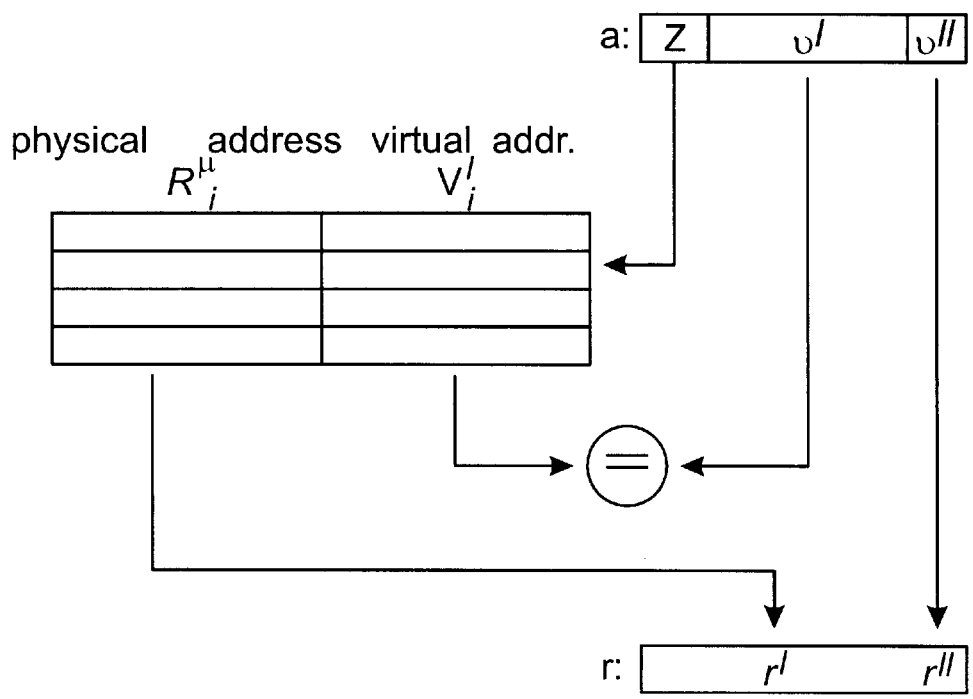
Figure 3:
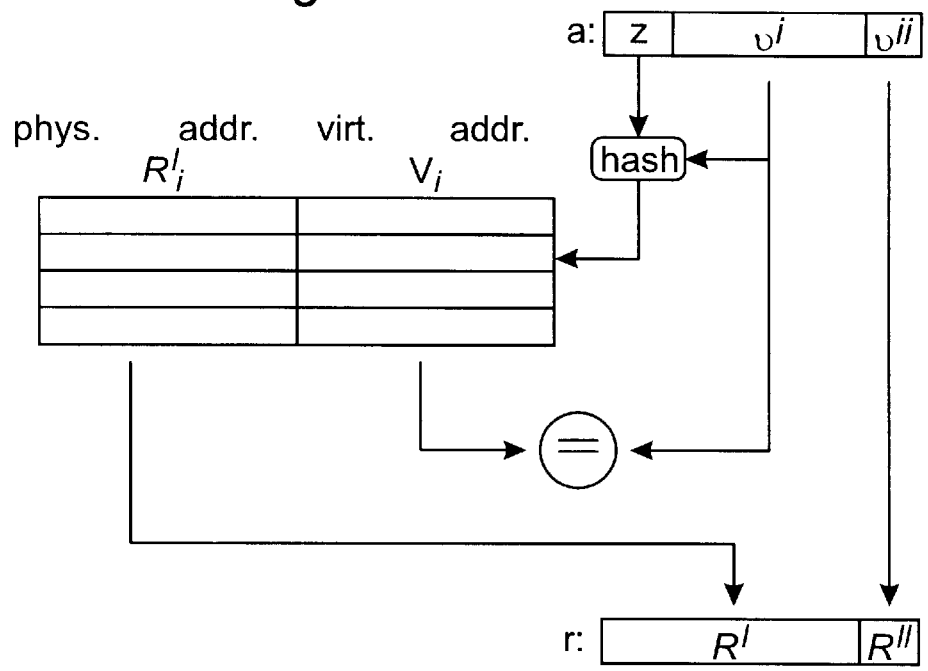

The following is a detailed description of embodiments of the invention taken with reference to the drawings. In the Figures:

FIG. 1 is a schematic view of the structure of a bit string having bits representing a virtual address and bits representing a routing code associated with this virtual address, FIG. 2 is a schematic representation of the indexing step in a TLB indexed directly by the routing code, FIG. 3 is a schematic representation of the indexing step in a TLB, indexed by a mapping (hash) function of the routing code and a portion of the virtual address, and FIG. 4 a schematic representation of the indexing step in a conventional direct-mapped TLB.

In this specification, it is assumed that large address spaces and correspondingly wide addresses, for instance of 64 bits, are given. A complete address (bit string), however, is not made up by a 64 bits wide virtual address, but is composed from a routing code and a virtual address. In the embodiment of FIG. 1, the virtual address v occupies the 56 lower order bits of the complete address and the routing code z takes the 8 higher order bits.

For the address translation itself (virtual→physical), the memory management unit (MMU) only uses the virtual address, i.e. the address space has a size of $2^{56}$ bytes. In this respect, the routing code z is redundant.

Providing convolutions of the address space is logical. In the Embodiment, all $2^{56}$ byte regions have a 256-fold convolution or a 256-fold aliasing. As can be seen from the following, this idea may be useful, but it is a poor means of describing routing code addressing.

It is differentiated between address translation by the TLB and address translation by table parsing. The latter is always performed when the address translation by the TLB has failed (TLB miss). For the address translation by table parsing, methods may be used, among others, which employ multi level page tables, inverted (hashed) page tables or guarded page tables. The only thing that matters is that, upon a successful translation, they map a virtual address v onto a virtual page number v', an offset v", a physical page number r' and, possibly, a page size s. (Of course, further results may be obtained by this address translation, such as access or status bits.) Thus, the virtual address v is mapped onto the physical address r=r'+v". The pair (v', r'), in case of a flexible page size, the triple (v', r', s), may then be stored in the TLB for subsequent address translation processes.

In contrast to the address translation by table parsing, the translation by the TLB uses the routing code as an essential input parameter. In a routing-code direct-addressed TLB (FIG. 2), only the routing code z is used to index the TLB cache.

In a routing-code hashed-addressed TLB (FIG. 3), the index is formed by a hash-function of the routing code z and a portion v' of the virtual address. Here, v' can be the page number, as illustrated, but it may also be only a part thereof. A simple hash function is, e.g., (z xor v') mod k, where k is the number of sets of an n-way set-associative TLB or the number of entries of a direct-mapped TLB.

FIGS. 2 and 3 each show a direct-mapped TLB for reasons of simplicity of illustration. An n-way set-associative TLB may be used accordingly without changes in the addressing mechanism.

By suitably selecting the routing codes, TLB clashes can be avoided or their number may be reduced.

The following is a discussion of how a TLB can be updated with respect to the routing codes associated with the virtual addresses.

Free User-Defined Routing Codes

Upon a TLB miss, this method uses the routing code z of the original complete address for the entry into the TLB (of course, besides v', r' etc.). Thus, upon another access via the same routing code (i.e., in particular, also via the same complete address), there will generally be a TLB hit.

Accesses to the same page via different routing codes are possible, but, generally, they occupy different TLB entries. To flush a page, the page must be flushed for all routing codes. Often, this suggests a flushing of the entire TLB.

Timely Defined User-Specified Routing Codes

Each page table entry of the last level (i.e. which directly indicates a data page), includes a routing code field z'. Upon a TLB miss, the routing code z defined by the uses is not only used for the TLB entry, but is also compared to z' in the routing code field of the page table entry. When there is no match (z≠z'), a TLB flush is executed with (z', v'), i.e. a TLB entry, possibly present on the same page, will be deleted. Thereafter, the new routing code is entered into the routing code field of the page table entry (z':=z). (this write access may of course be omitted when the routing code in the page table entry matches the present one (z=z')).

Finally, the TLB is loaded with (z, v', r' ) (and possibly further parameters resulting from the address translation).

Since now there is a maximum of one entry in a page with the number v' in the TLB, a flushing of a single page is simple:

1. First, an address translation of v' is done using the page table. The page table will provide, among others, the present routing code z' used for v'.
2. The TLB is accessed with the complete address a=(z', v').
3. If a hit was obtained thereby, the corresponding TLB entry will be flushed.
4. The new routing code is accepted into the page table entry.

Pages can only be flushed with this method, if they can be reached via the page tables.

Fixed System-Defined Routing Codes

The page table entries of the last level contain a routing code field z' ste by the system kernel. Upon a TLB miss it is checked whether z=z' holds, i.e., whether the correct routing code is included in the complete address. If there is no match, a routing code error or an exception is signaled.

System-Defined Routing Codes with Update

The page table entries of the last level contain a routing code field z' ste by the system kernel. Upon a TLB miss it is checked whether z=z' holds, i.e., whether the correct routing code is included in the complete address. If there is no match, the routing code of the page table entry is accepted: z:=z'. If the original address (z, v') is in a register r, the new routing code z' is also taken into this register, i.e., r=(z', v') will then hold. A new access will then be made automatically with the "correct" routing code.

1dz-Instruction

In all above variants (except for the first one), a new machine instruction

1dz r,v may be implemented, which loads the present routing code of the page defined by the virtual address v into the register r. When the loading of the routing code is implemented such that only the routing code bits of the register are changed, 1dz r,[r] can be used to form a complete address with a "correct" routing code.

Routing-Code-Controlled Replacement of TLB Entries

The routing codes may be enlarged by one or more control bits that are not directly used to index the TLBs, but serve for the management of the TLB, for example, they determine that corresponding entries in the TLB should be moved out particularly early or particularly late. For example, bit 7 of the routing code is used as an early flush bit. To address the TLB, only the bits 0 . . . 6 of the routing code are used. Bit 7, the early flush bit, is taken over into the TLB entry as a control bit. If a TLB entry of the corresponding TLB set is to be moved out, priority is give to the selection of an entry with a set early flush bit.

I claim:

1. A method for operating an address translation device for translating a virtual address of a virtual address space comprising a plurality of pages into a physical address of a physical address space comprising a plurality of pages, with the use of a translation lookaside buffer and a page table, wherein the virtual address comprises a first address portion and a second address portion, and the virtual address is associated with a routing code, the physical address has first and second address portions, and the translation lookaside buffer contains a plurality of entries, each of which comprises at least one tag field and at least one data field associated to the tag field, the address translation being performed in the following manner:

the translation lookaside buffer is indexed to an index by the routing code associated with the virtual address or by a mapping of the routing code associated with the virtual address, or it is indexed to an index by a mapping of the routing code associated with the virtual address and the first address portion of the virtual address;

it is checked, whether the contents of a tag field the indexed entry of the translation lookaside buffer match the first address portion of the virtual address;

if a tag field exists with contents that match the first address portion of the virtual address, there is a TLB hit, and the physical address is composed from the contents of the data field associated with this tag field, as the first address portion of the physical address, and from the second address portion of the virtual address;

if there is no tag field in the indexed entry that would match the first address portion of the virtual address, there is a TLB miss, and the first address portion of the physical address is derived from the page table, the page table being parsed according to the virtual address without requiring use of the routing code, and the physical address being composed from the first address portion resulting from the first address portion and from the second address portion of the virtual address, and the first address portion of the virtual address, as well as the first address portion of the physical address resulting from the page table being taken into the TLB, wherein, upon a TLB miss, the first address portion of the virtual address and the first address portion of the physical address resulting from the page table are loaded into that entry of the translation lookaside buffer that has been indexed during the access to the translation lookaside buffer, which is the basis of the TLB miss.

2. The method of claim 1, characterized in that the page table provides a routing code field with a routing code, in addition to the first address portion of a physical address, the contents of the routing code field, resulting from the parsing of the page table, is compared to the routing code associated with the virtual address, if the contents of the routing code field do not match the routing code associated with the virtual address, the translation lookaside buffer is indexed using the contents of the routing code field or the contents of the routing code field and the first address portion of the virtual address, upon a TLB hit, the respective data field of the translation lookaside buffer is tagged as invalid, and the routing code associated with the virtual address is stored in the routing code field of the page table entry, and the first address portion of the virtual address and the first address portion of the physical address resulting from the page table will then be loaded into the entry of the translation lookaside buffer that has been indexed using the routing code associated with the virtual address or using the routing code associated with the virtual address and the first address portion of the virtual address.

3. The method of claim 1, characterized in that the page table provides a routing code field with a routing code, in addition to the first address portion of a physical address, and upon a TLB miss, the physical address is composed corresponding to the address portion resulting from the page table only when the routing code provided by the page table matches the routing code associated with the virtual address, otherwise, a routing code error is indicated.

4. The method of claim 1, characterized in that the page table provides a routing code field with a routing code, in addition to the first address portion of a physical address, and if there is a TLB miss and the routing code provided by the page table does not match the routing code associated with the virtual address, the routing code provided by the page table may be associated to the virtual address for the present translation and for the future translation thereof.

5. The method of claim 1, characterized in that the routing codes associated with the virtual addresses include one or a plurality of control bits that do not serve to index the translation lookaside buffer, but to manage the translation lookaside buffer.

6. The method of claim 1, characterized in that the virtual address is part of a bit string having bits for the first address portion of the virtual address, bits for the second portion of the virtual address and bits for the routing code associated with the virtual address.

7. The method of claim 1, characterized in that each entry of the TLB has at least one routing code field associated with a tag field, and that the routing code associated with the virtual address is compared with the contents of that tag field of the indexed entry of the translation lookaside buffer whose contents is equal to that of the first address portion of the virtual address, and that there is a TLB hit when the routing code associated with the virtual address equals the routing code of the routing code field.

8. A method for operating an address translation device for translating a virtual address of a virtual address space comprising a plurality of pages into a physical address of a physical address space comprising a plurality of pages, with the use of a translation lookaside buffer and a page table, wherein the virtual address comprises a first address portion and a second address portion, and the virtual address is associated with a routing code, the physical address has first and second address portions, and the translation lookaside buffer contains a plurality of entries, each of which comprises at least one tag field and at least one data field associated to the tag field, the address translation being performed in the following manner:

the translation lookaside buffer is indexed to an index by the routing code associated with the virtual address or by a mapping of the routing code associated with the virtual address, or it is indexed to an index by a mapping of the routing code associated with the virtual address and the first address portion of the virtual address;

it is checked, whether the contents of a tag field the indexed entry of the translation lookaside buffer match the first address portion of the virtual address;

if a tag field exists with contents that match the first address portion of the virtual address, there is a TLB hit, and the physical address is composed from the contents of the data field associated with this tag field, as the first address portion of the physical address, and from the second address portion of the virtual address;

if there is no tag field in the indexed entry that would match the first address portion of the virtual address, there is a TLB miss, and the first address portion of the physical address is derived from the page table, the page table being parsed according to the virtual address without requiring use of the routing code, and the physical address being composed from the first address portion resulting from the first address portion and from the second address portion of the virtual address, and the first address portion of the virtual address, as well as the first address portion of the physical address resulting from the page table being taken into the TLB, and wherein the page table provides a routing code field with a routing code, in addition to the first address portion of a physical address, the contents of the routing code field, resulting from the parsing of the page table, is compared to the routing code associated with the virtual address, if the contents of the routing code field do not match the routing code associated with the virtual address, the translation lookaside buffer is indexed using the contents of the routing code field or the contents of the routing code field and the first address portion of the virtual address, upon a TLB hit, the respective data field of the translation lookaside buffer is tagged as invalid, and the routing code associated with the virtual address is stored in the routing code field of the page table entry, and the first address portion of the virtual address and the first address portion of the physical address resulting from the page table will then be loaded into the entry of the translation lookaside buffer that has been indexed using the routing code associated with the virtual address or using the routing code associated with the virtual address and the first address portion of the virtual address.

9. A method for operating an address translation device for translating a virtual address of a virtual address space comprising a plurality of pages into a physical address of a physical address space comprising a plurality of pages, with the use of a translation lookaside buffer and a page table, wherein the virtual address comprises a first address portion and a second address portion, and the virtual address is associated with a routing code, the physical address has first and second address portions, and the translation lookaside buffer contains a plurality of entries, each of which comprises at least one tag field and at least one data field associated to the tag field, the address translation being performed in the following manner:

the translation lookaside buffer is indexed to an index by the routing code associated with the virtual address or by a mapping of the routing code associated with the virtual address, or it is indexed to an index by a mapping of the routing code associated with the virtual address and the first address portion of the virtual address;

it is checked, whether the contents of a tag field the indexed entry of the translation lookaside buffer match the first address portion of the virtual address;

if a tag field exists with contents that match the first address portion of the virtual address, there is a TLB hit, and the physical address is composed from the contents of the data field associated with this tag field, as the first address portion of the physical address, and from the second address portion of the virtual address;

if there is no tag field in the indexed entry that would match the first address portion of the virtual address, there is a TLB miss, and the first address portion of the physical address is derived from the page table, the page table being parsed according to the virtual address without requiring use of the routing code, and the physical address being composed from the first address portion resulting from the first address portion and from the second address portion of the virtual address, and the first address portion of the virtual address, as well as the first address portion of the physical address resulting from the page table being taken into the TLB, and wherein the page table provides a routing code field with a routing code, in addition to the first address portion of a physical address, and upon a TLB miss, the physical address is composed corresponding to the address portion resulting from the page table only when the routing code provided by-the page table matches the routing code associated with the virtual address, otherwise, a routing code error is indicated.

10. A method for operating an address translation device for translating a virtual address of a virtual address space comprising a plurality of pages into a physical address of a physical address space comprising a plurality of pages, with the use of a translation lookaside buffer and a page table, wherein the virtual address comprises a first address portion and a second address portion, and the virtual address is associated with a routing code, the physical address has first and second address portions, and the translation lookaside buffer contains a plurality of entries, each of which comprises at least one tag field and at least one data field associated to the tag field, the address translation being performed in the following manner:

the translation lookaside buffer is indexed to an index by the routing code associated with the virtual address or by a mapping of the routing code associated with the virtual address, or it is indexed to an index by a mapping of the routing code associated with the virtual address and the first address portion of the virtual address;

it is checked, whether the contents of a tag field the indexed entry of the translation lookaside buffer match the first address portion of the virtual address;

if a tag field exists with contents that match the first address portion of the virtual address, there is a TLB hit, and the physical address is composed from the contents of the data field associated with this tag field, as the first address portion of the physical address, and from the second address portion of the virtual address;

if there is no tag field in the indexed entry that would match the first address portion of the virtual address, there is a TLB miss, and the first address portion of the physical address is derived from the page table, the page table being parsed according to the virtual address without requiring use of the routing code, and the physical address being composed from the first address portion resulting from the first address portion and from the second address portion of the virtual address, and the first address portion of the virtual address, as well as the first address portion of the physical address resulting from the page table being taken into the TLB, and wherein the page table provides a routing code field with a routing code, in addition to the first address portion of a physical address, and if there is a TLB miss and the routing code provided by the page table does not match the routing code associated with the virtual address, the routing code provided by the page table may be associated to the virtual address for the present translation and for the future translation thereof.

* * * * *